(12) United States Patent
Wakata

(10) Patent No.: US 10,431,129 B2
(45) Date of Patent: Oct. 1, 2019

(54) INFORMATION PROCESSING DEVICE

(71) Applicant: Sharp Kabushiki Kaisha, Sakai, Osaka (JP)

(72) Inventor: Kuniharu Wakata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/062,684

(22) PCT Filed: Sep. 28, 2016

(86) PCT No.: PCT/JP2016/078692
§ 371 (c)(1),
(2) Date: Jun. 15, 2018

(87) PCT Pub. No.: WO2018/061119
PCT Pub. Date: Apr. 5, 2018

(65) Prior Publication Data
US 2019/0005857 A1    Jan. 3, 2019

(51) Int. Cl.
| | |
|---|---|
| *G06F 1/16* | (2006.01) |
| *G09F 9/30* | (2006.01) |
| *H01L 27/32* | (2006.01) |
| *H04M 1/02* | (2006.01) |
| *H05K 5/02* | (2006.01) |
| *G09F 9/00* | (2006.01) |
| *H05K 5/00* | (2006.01) |
| *H05K 7/00* | (2006.01) |

(52) U.S. Cl.
CPC .......... *G09F 9/301* (2013.01); *G06F 1/1652* (2013.01); *G09F 9/00* (2013.01); *G09F 9/30* (2013.01); *H01L 27/32* (2013.01); *H04M 1/02* (2013.01); *H04M 1/0216* (2013.01); *H04M 1/0268* (2013.01); *H05K 5/02* (2013.01); *G06F 1/1616* (2013.01); *G06F 2203/04102* (2013.01)

(58) Field of Classification Search
CPC . G06F 1/1616; G06F 1/1683; H01L 51/0096; H01L 51/5237; H01L 51/0097; H01L 2251/5338
USPC ............................ 361/679.27, 679.28, 749
See application file for complete search history.

(56) References Cited

U.S. PATENT DOCUMENTS

| | | | |
|---|---|---|---|
| 2014/0226275 A1 | 8/2014 | Ko et al. | |
| 2015/0358512 A1 | 12/2015 | Mitsui | |
| 2016/0007441 A1* | 1/2016 | Matsueda | G06F 1/1652 361/749 |
| 2016/0270246 A1 | 9/2016 | Mitsui | |

FOREIGN PATENT DOCUMENTS

| | | |
|---|---|---|
| JP | 58-000483 U | 1/1983 |
| JP | 04-085787 U | 7/1992 |
| JP | 2006-217251 A | 8/2006 |

(Continued)

OTHER PUBLICATIONS

Official Communication issued in International Patent Application No. PCT/JP2016/078692, dated Dec. 27, 2016.

*Primary Examiner* — Binh B Tran
(74) *Attorney, Agent, or Firm* — Keating & Bennett, LLP

(57) ABSTRACT

Provided is an information processing device wherein, in a first state where a first side face and a second side face are disposed facing each other, a support member can be fitted into a first opening and a second opening and fixed.

20 Claims, 9 Drawing Sheets

(56) References Cited

FOREIGN PATENT DOCUMENTS

| JP | 2014-137455 A | 7/2014 |
|---|---|---|
| JP | 2014-161009 A | 9/2014 |
| JP | 2015-211384 A | 11/2015 |
| JP | 2016-015618 A | 1/2016 |

\* cited by examiner

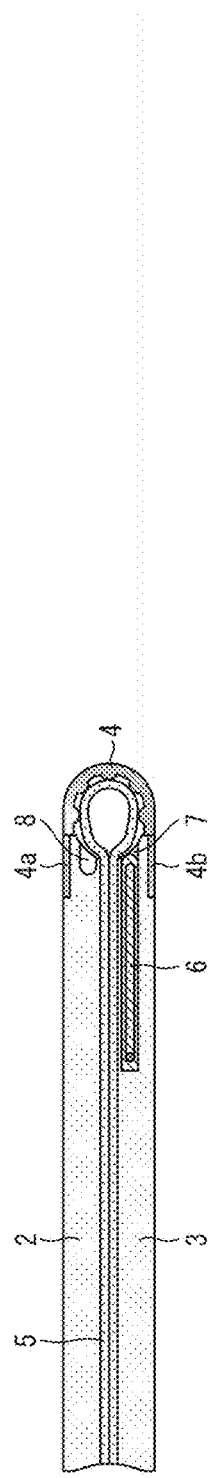
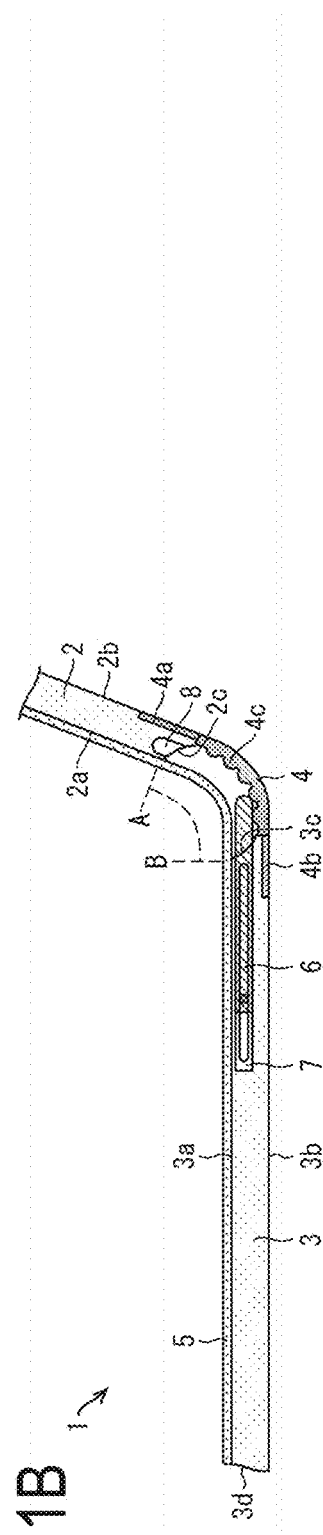
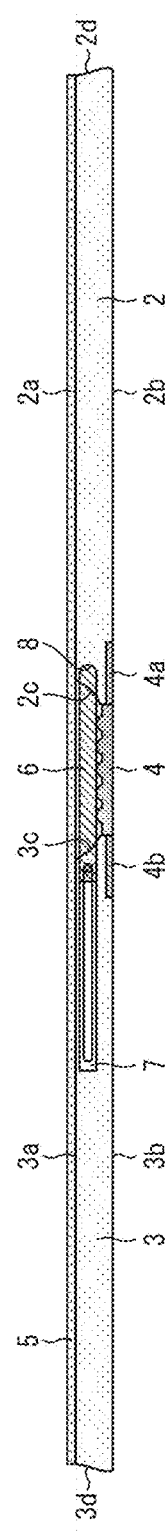

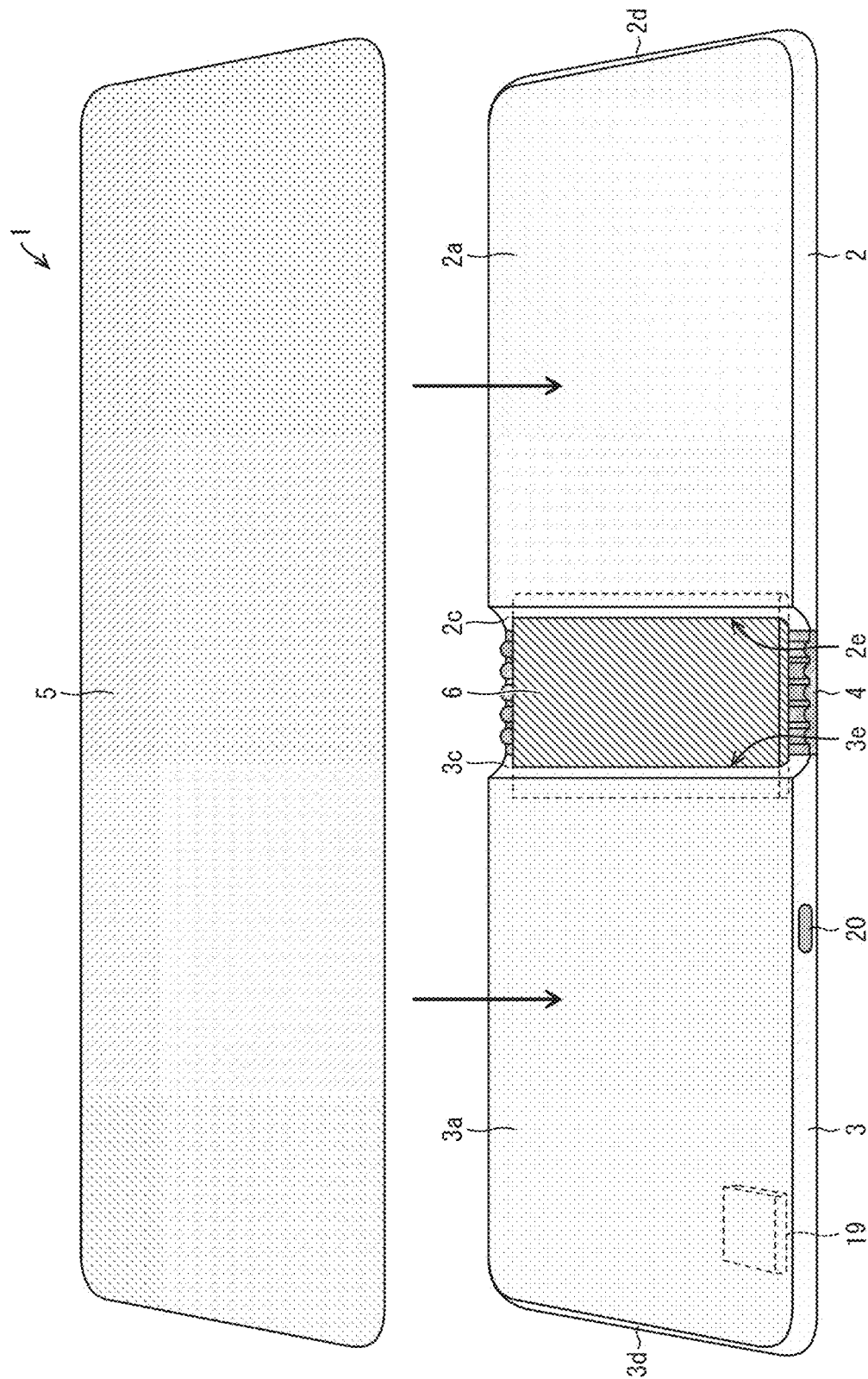

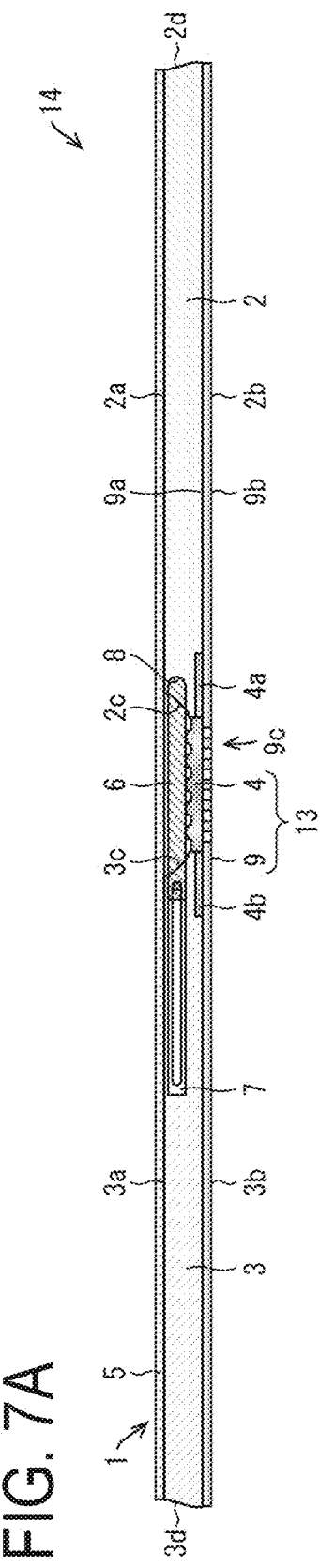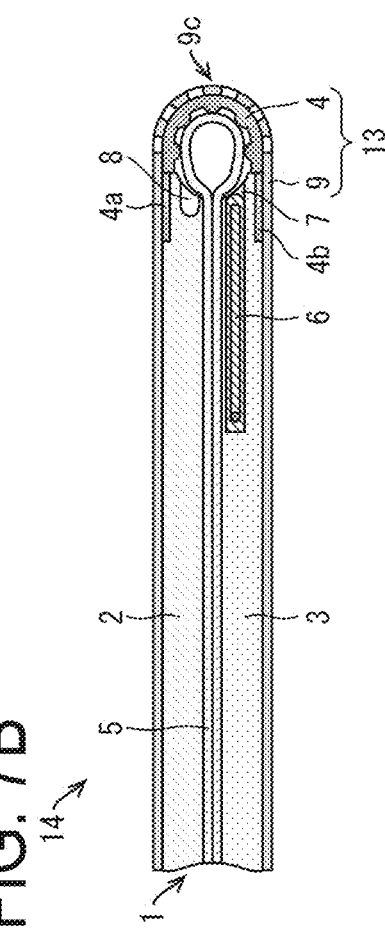

INFORMATION PROCESSING DEVICE

TECHNICAL FIELD

The disclosure relates to an information processing device that includes a flexible display panel, and particularly relates to a foldable information processing device that includes a flexible display panel.

BACKGROUND ART

Information processing devices, such as a smartphone or a tablet, that include a flexible display panel, such as a flexible organic electroluminescent (EL) panel, can be used while bending or unbending and making flat the flexible display panel itself, and are thus attracting much attention.

PTL 1 describes a flexible mobile terminal device that includes a flexible display panel.

FIG. 9A is a diagram in PTL 1 illustrating an overall configuration of a flexible mobile terminal device 100 of the related art that includes a flexible display panel 101.

FIG. 9B is a diagram illustrating an overall configuration of a folding portion 102 provided to the flexible mobile terminal device 100 of the related art illustrated in FIG. 9A.

As illustrated in FIG. 9B, the folding portion 102 includes free stop hinges 103 made from a shape memory alloy material, for example, to ensure that a bent state of the folding portion 102 can be maintained.

Then, the folding portion 102 that includes the free stop hinges 103 is disposed in a substantially central portion of the flexible mobile terminal device 100, on a rear face of the flexible display panel 101 of the flexible mobile terminal device 100 illustrated in FIG. 9A, making it possible to bend and fix, or unbend and fix, the flexible mobile terminal device 100.

CITATION LIST

Patent Literature

PTL 1: JP 2014-161009 A (published Sep. 4, 2014)
PTL 2: JP 2014-137455 A (published Jul. 28, 2014)
PTL 3: JP 2015-211384 A (published Nov. 24, 2015)

SUMMARY

Technical Problem

While the flexible mobile terminal device 100 described in PTL 1 is provided with the folding portion 102 that includes the free stop hinges 103, making it possible to bend and fix or unbend and fix the flexible mobile terminal device 100, the problem arises that the fixed state is weak, causing the flexible mobile terminal device 100 to readily change from the fixed state to a non-preferred state by unpredictable contact or the like.

Further, with the flexible mobile terminal device 100 described in PTL 1, the folding portion 102 that includes the free stop hinges 103 is configured to come into contact with the flexible display panel 101 in the substantially central portion of the flexible display panel 101.

The folding portion 102 that includes the free stop hinges 103 is configured to be bendable in its entirety to a front side or a rear side and thus, even when the folding portion 102 and the free stop hinges 103 are returned to a flat state, sections where ridges remain on front faces of the folding portion 102 and the free stop hinges 103 exist in accordance with the number of years of usage of the flexible mobile terminal device 100.

In such sections where ridges remain on the front faces of the folding portion 102 and the free stop hinges 103, the ridges make input by a touch operation difficult when the flexible display panel 101 is used from above such ridges, causing problematic deterioration of the display quality of the flexible display panel 101.

In light of the problems described above, an object of the disclosure is to provide an information processing device that is capable of suppressing a possibility of change to a non-preferred state by unpredictable contact or the like, and suppressing the effects of ridges when a section where ridges remain on a front face of a hinge occurs in association with the number of years of usage.

Solution to Problem

An information processing device according to the disclosure for solving the above-described problems includes a first housing provided with a front face, a rear face, a first side face, and a first opening, the front face and the rear face facing each other; a second housing provided with a front face, a rear face, a second side face, and a second opening, the front face and the rear face facing each other; a first hinge that connects a lower portion of the first housing that includes the rear face of the first housing, and a lower portion of the second housing that includes the rear face of the second housing; and a flexible display panel provided across the front face of the first housing and the front face of the second housing. The first hinge includes a plate-shaped hinge configured to at least partially bend. The first opening of the first side face of the first housing and the second opening of the second side face of the second housing, the first side face and the second side face being adjacent to the first hinge, are provided such that at least a portion of the first opening and at least a portion of the second opening are disposed facing each other in a first state where the first side face and the second side face are disposed facing each other. A support member is provided being configured to move between the flexible display panel and the first hinge, from one of the first side face and the second side face toward the other. The support member, in the first state, is fitted into the first opening and the second opening and fixed. Further, the support member, in a second state where the first side face and the second side face are not facing each other, is stored in an interior of one of the first housing and the second housing or fitted into one of the first opening and the second opening.

According to the above-described configuration, in the first state where the first side face and the second side face are disposed facing each other, the support member can be fitted into the first opening and the second opening and fixed, making it possible to suppress the possibility of change from the first state to a non-preferred state by unpredictable contact or the like.

According to the above-described configuration, in the second state where the first side face and the second side face are disposed not facing each other, the support member is stored in an interior of one of the first housing and the second housing or fitted into one of the first opening and the second opening, and thus is never bendable in the first state or the second state.

Further, according to the above-described configuration, in the first state, the support member exists between the flexible display panel and the first hinge, making it possible to suppress the effects of ridges when a section where ridges remain on a front face of the first hinge occurs in association with the number of years of usage.

Furthermore, according to the above-described configuration, the first hinge includes a plate-shaped hinge configured to at least partially bend, making it possible to achieve an information processing device that is thin and free of large protruding portions compared to when, in related art, a U-shaped hinge provided to a storage space or the like is used.

Advantageous Effects of Disclosure

According to a first aspect of the disclosure, it is possible to provide an information processing device that is capable of suppressing a possibility of change to a non-preferred state by unpredictable contact or the like, and suppressing the effects of ridges when a section where ridges remain on a front face of a hinge occurs in association with the number of years of usage.

BRIEF DESCRIPTION OF DRAWINGS

FIG. 1A is a diagram illustrating an information processing device, including a flexible display panel, fully closed, FIG. 1B is a diagram illustrating the information processing device slightly opened, and FIG. 1C is a diagram illustrating the information processing device fully opened.

FIG. 2 is a diagram illustrating an overall configuration of the information processing device in the state illustrated in FIG. 1C.

FIGS. 7A and 7B are diagrams illustrating an overall configuration of the information processing device with the living hinge provided across an interior of the first housing and an interior of the second housing. FIG. 7A illustrates this information processing device fully opened, and FIG. 7B illustrates this information processing device fully closed.

DESCRIPTION OF EMBODIMENTS

Figure 3:
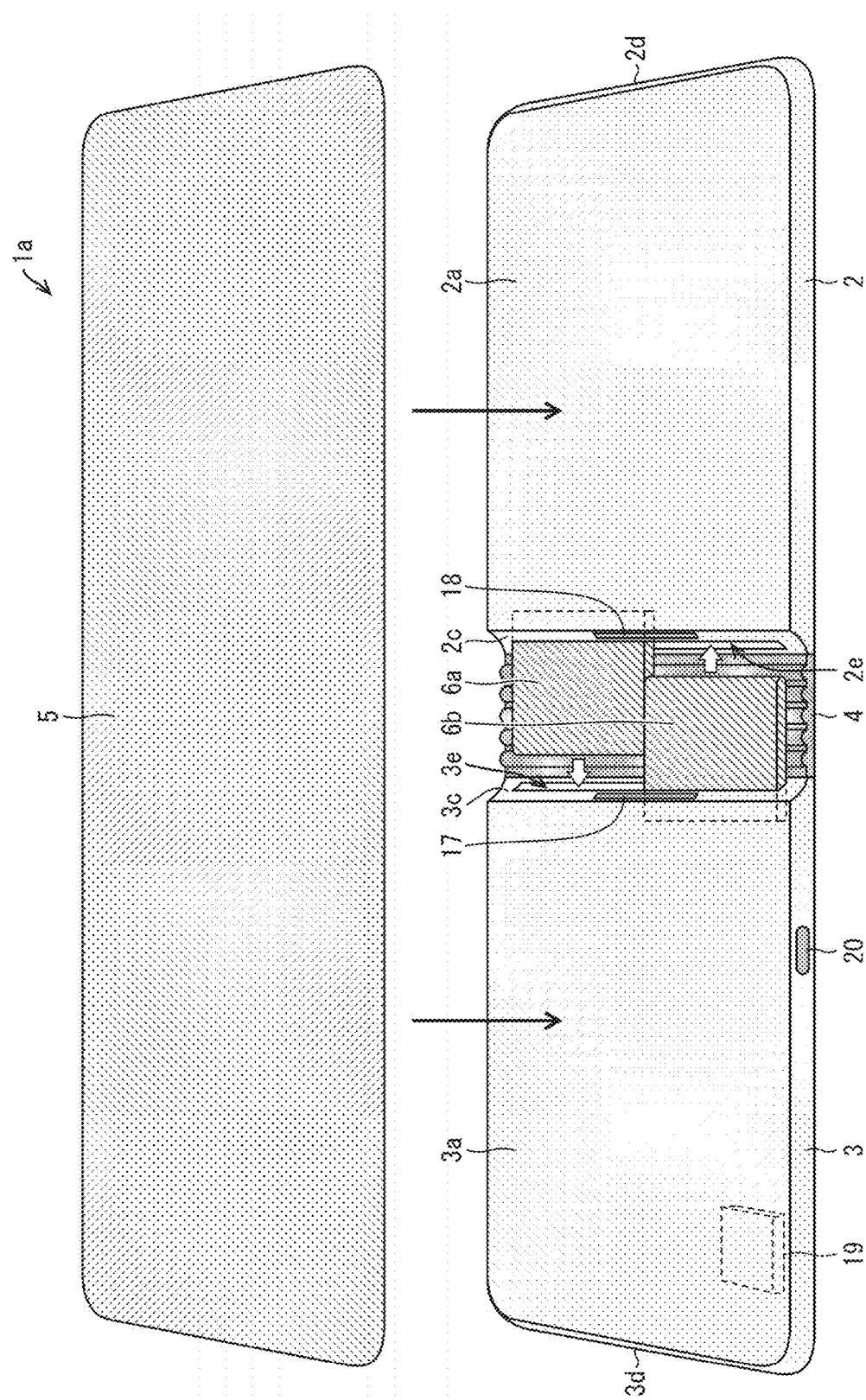
FIG. 3 is a diagram illustrating an overall configuration of the information processing device provided with two support members, a light receiving element, and a light emitting element.

Embodiments of the disclosure are described below with reference to FIGS. 1A to 8. In the following, for convenience of explanation, components having the same function as those described in a specific embodiment are denoted using the same reference numerals, and descriptions thereof will be omitted.

First Embodiment

A first embodiment of the disclosure will be described below with reference to FIGS. 1A to 3.

FIG. 1A is a diagram illustrating an information processing device 1, including a flexible display panel 5, fully closed, FIG. 1B is a diagram illustrating the information processing device 1 slightly opened, and FIG. 1C is a diagram illustrating the information processing device 1 fully opened.

FIG. 2 is a diagram illustrating an overall configuration of the information processing device 1 in the state illustrated in FIG. 1C.

As illustrated in FIGS. 1A to 2, the information processing device 1 includes a first housing 2, a second housing 3, a hinge 4 (first hinge) that connects the first housing 2 and the second housing 3, and a flexible display panel 5 provided across a front face 2a of the first housing 2 and a front face 3a of the second housing 3.

As illustrated in FIGS. 1C and 2, in a first state, which is the state in FIG. 1C, where a first side face 2c of the first housing 2 (a side face facing a side face 2d of the first housing 2) and second side face 3c of the second housing 3 (a side face facing a side face 3d of the second housing 3), each adjacent to the hinge 4, are disposed facing each other, a first opening 2e of the first side face 2c and a second opening 3e of the second side face 3c are provided so that at least a portion of the first opening 2e and at least a portion of the second opening 3e face each other.

While in the present embodiment an example is given of a case where the first opening 2e as a whole and the second opening 3e as a whole are disposed facing each other with one first opening 2e provided on the first side face 2c, one second opening 3e provided on the second side face 3c, and the first side face 2c and the second side face 3c disposed facing each other, the present disclosure is not limited thereto. Thus, a plurality of openings may be provided in the first side face 2c and the second side face 3c or, when both side faces are disposed facing each other, at least a portion of each of the openings provided to both side faces may be disposed facing each other.

In the present embodiment, an example is given of a case where the first opening 2e provided to the first side face 2c of the first housing 2 is formed into a shape allowing storage of a second rail 8 and one portion 4a of the hinge 4 in the first housing 2, and the second opening 3e provided to the second side face 3c of the second housing 3 is formed into a shape allowing storage of a first rail 7 and one portion 4b of the hinge 4 in the second housing 3. The present disclosure, however, is not limited thereto, and the shape of the first opening 2e and the second opening 3e does not necessarily need to be formed into shapes that allow storage of the one portions 4a, 4b of the hinge 4 in the first housing 2 and the second housing 3.

Note that a battery configured to supply power to the information processing device 1 as a whole, a wired/wireless communication device, a central processing unit (CPU), various memory, the first rail 7 and the second rail 8, a control circuit 19 configured to control a support member 6, and the like are suitably stored in the interiors of the first housing 2 and the second housing 3.

In the present embodiment, the one portion 4a of the hinge 4 is placed over the first housing 2 via the first opening 2e and fixed with a screw, and the one portion 4b of the hinge 4 is placed over the second housing 3 via the second opening 3e and fixed with a screw. The present disclosure, however, is not limited thereto. For example, the one portion 4a of the hinge 4 may be placed over the first housing 2 via a rear face 2b of the first housing 2 and fixed with a screw, and the one portion 4b of the hinge 4 may be placed over the second housing 3 via a rear face 3b of the second housing 3 and fixed with a screw. That is, a lower portion that includes the rear face 2b of the first housing 2 and a lower portion that includes the rear face 3b of the second housing 3 may be connected using the hinge 4. Note that an adhesive or the like may be used for the method of fixation in place of the screw.

In the present embodiment, the information processing device 1 is mainly used as a tablet in the first state, which is the state in FIG. 1C, where the first side face 2c and the second side face 3c are disposed facing each other, and a flexible hinge that has a plate shape and bends as a whole is used as the hinge 4 taking into consideration that the information processing device 1 is fully closed and stored as illustrated in FIG. 1A or closed and stored so that the flexible display panel 5 is disposed on the outer side (not illustrated). The present disclosure, however, is not limited thereto, and a hinge that has a plate-shape and at least partially bends may be used. Based on the above, examples of the hinge 4 used include a flexible hinge made from a flexible material such as a rubber or a silicone material, a hinge that partially includes a shape memory alloy material or a metal material in a rubber or a silicone material, a living hinge described in detail later, or the like, but the hinge 4 is not limited thereto.

Note that "flexible hinge" refers to a hinge that is, for example, made from a flexible material such as a rubber or a silicone material, and realizes a rotating motion by the flexibility of the material that forms the hinge.

In the hinge 4, ridges 4c may be formed on the face facing the flexible display panel 5 or the support member 6. The ridges 4c makes it possible to protect the flexible display panel 5 or the support member 6 when the hinge 4 comes into contact with the flexible display panel 5 or the support member 6.

Further, while not illustrated, the hinge 4 may include a conductor or that forms a flexible wire or the like.

In the present embodiment, a plate-shaped flexible hinge is used as the hinge 4, making it possible to achieve an information processing device 1 that is thin and free of large protruding portions compared to when, in related art, a U-shaped hinge provided to a storage space or the like is used.

Note that while, in the present embodiment, the flexible organic EL layer display panel is used as the flexible display panel 5, the type is not particularly limited as long as the panel is a flexible display panel and thus, for example, a reflective liquid crystal display panel or the like may be used.

In the present embodiment, taking into consideration that one of the first housing 2 and the second housing 3 is to rotate approximately 360 degrees with respect to the other without damaging the flexible display panel 5, the flexible display panel 5, as illustrated in FIG. 1B, is fixed only to the front face 2a of the first housing 2 and the front face 3a of the second housing 3 and not fixed at any location between A and B of the flexible display panel 5, making the flexible display panel both fixed and free. The present disclosure, however, is not limited thereto.

As illustrated in FIGS. 1A to 2, the information processing device 1 includes the support member 6 configured to move between the flexible display panel 5 and the hinge 4, from one of the first side face 2c of the first housing 2 and the second side face 3c of the second housing 3 to the other.

In the present embodiment, when the information processing device 1 is changed from the state illustrated in FIGS. 1A and 1B, that is, the second state where the first side face 2c of the first housing 2 and the second side face 3c of the second housing 3 are disposed not facing each other, to the state illustrated in FIG. 1C, that is, the first state where the first side face 2c of the first housing 2 and the second side face 3c of the second housing 3 are disposed facing each other, the support member 6 moves between the flexible display panel 5 and the hinge 4, from the second side face 3c of the second housing 3 toward the first side face 2c of the first housing 2, and is fitted into the first opening 2e and the second opening 3e and fixed. The present disclosure, however, is not limited thereto, and thus, the support member 6 may move between the flexible display panel 5 and the hinge 4, from the first side face 2c of the first housing 2 toward the first side face 3c of the second housing 3, and be fitted into the first opening 2e and the second opening 3e and fixed.

Further, in the present embodiment, when the information processing device 1 is changed from the state illustrated in FIG. 1C, that is, the first state, to the state illustrated in FIGS. 1A and 1B, that is, the second state, the support member 6 moves between the flexible display panel 5 and the hinge 4, from the first side face 2c of the first housing 2 toward the second side face 3c of the second housing 3, and is stored in the interior of the second housing 3 or fitted into the second opening 3e. The present disclosure, however, is not limited thereto, and thus the support member 6 may moves between the flexible display panel 5 and the hinge 4, from the second side face 3c of the second housing 3 toward the first side face 2c of the first housing 2, and be stored in the interior of the first housing 2 or fitted into the first opening 2e.

As described above, the support member 6 is fitted into the first opening 2e and the second opening 3e and fixed in the first state of the information processing device 1, and stored in the interior of one of the first housing 2 and the second housing 3 or fitted into one of the first opening 2e and the second opening 3e in the second state of the information processing device 1.

Thus, according to the information processing device 1, in the first state, the support member 6 is fitted into the first opening 2e and the second opening 3e and fixed, making it possible to suppress a possibility of change from the first state to a non-preferred state by unpredictable contact or the like.

Further, according to the information processing device 1, in the second state, the support member 6 is stored in the interior of one of the first housing 2 and the second housing 3 or fitted into one of the first opening 2e and the second opening 3e, and thus the support member 6 is never bendable in the first state or the second state.

Further, according to the information processing device 1, the support member 6 exists between the flexible display panel 5 and the hinge 4 in the first state, making it possible to suppress the effects of ridges when a section where ridges remain on a front face of the hinge 4 occurs in association with the number of years of usage.

In the first state of the information processing device 1, an upper face of the support member 6, the front face 2a of the first housing 2 on which the flexible display panel 5 is provided, and the front face 3a of the second housing 3 on which the flexible display panel 5 is provided preferably form a same plane.

Thus, in the present embodiment, a size that includes the thickness of the support member 6 is set so that the upper face of the support member 6, the front face 2a of the first housing 2 on which the flexible display panel 5 is provided, and the front face 3a of the second housing 3 on which the flexible display panel 5 is provided can form the same plane.

Further, in the present embodiment the second rail 8 is provided to the interior of the first housing 2, the first rail 7 is provided to the interior of the second housing 3, and the support 6 is configured to move along the first and second rails 7, 8. However, the present disclosure is not limited thereto, and a rail may be provided to one of the first housing 2 and the second housing 3, or not provided.

Further, according to the information processing device 1, as illustrated in FIG. 1A, when the front face of the first housing 2 and the front face of the second housing 3 are disposed facing each other and overlap, the flexible display panel 5 of the first housing 2 and the flexible display panel 5 of the second housing 3 come into contact.

Furthermore, according to the information processing device 1, as illustrated in FIG. 1A, the portions of the flexible display panel 5 that are provided between the first housing 2 and the second housing 3 and face each other (the portions of the flexible display panel 5 provided to an area other than to the first housing 2 and the second housing 3) stretch and curve into an arc shape from the portion where the flexible display panel 5 of the front face of the first housing 2 and the flexible display panel 5 of the front face of the second housing 3 come into contact.

According to the configuration described above, when the front face of the first housing 2 and the front face of the second housing 3 are disposed facing each other and overlap, damage to the flexible display panel 5 can be suppressed.

Note that, in the present embodiment, the position of the support member 6 is determined by a selection by a user of the information processing device 1.

When the user fixes the information processing device 1 to the state illustrated in FIG. 1C, that is, to the first state, the user clicks a button 20 illustrated in FIG. 2 with the information processing device 1 in the first state, and the support member 6 is then fixed to a predetermined position (the position in which the support member 6 is fitted into the first opening 2e and the second opening 3e) by a first control signal from the control circuit 19 configured to control the position of the support member 6.

On the other hand, when the user fixes the information processing device 1 to the state illustrated in FIGS. 1A and 1B, that is, the second state, from the state illustrated in FIG. 1C, that is, the first state, the user clicks the button 20 illustrated in FIG. 2 once again with the information processing device 1 in the first state, and the support member 6 is then moved to a predetermined position (the position in which the support member 6 is stored in the interior of one of the first housing 2 and the second housing 3, or the position in which the support member 6 is fitted into one of the first opening 2e or the second opening 3e) by a second control signal from the control circuit 19 configured to control the position of the support member 6.

In the present embodiment, when the user changes the information processing device 1 from the first state to the second state, the support member 6 is set to a position of being fitted into one of the first opening 2e and the second opening 3e and, by contact with the hinge 4, is gradually stored in the interior of one of the first housing 2 and the second housing 3.

Modification

FIG. 3 is a diagram illustrating an overall configuration of an information processing device 1a that includes two support members 6a, 6b, a light receiving element 17, and a light emitting element 18.

While an example with one support member 6 in the information processing device 1 has been described above, a plurality of support members may be provided. The information processing device 1a includes the two support members 6a, 6b, and the directions in which the support member 6a and the support member 6b move between the flexible display panel 5 and the hinge 4 are opposite each other.

Furthermore, in the information processing device 1a, the information processing device 1a can be fixed to the first state using the light emitting element 18 provided to the first side face 2c of the information processing device 1a, and the light receiving element 17 for receiving the light from the light emitting element 18, provided to the second side face 3c.

Note that the present disclosure is not limited thereto, and the light emitting element 18 may be provided to the second side face 3c, and the light receiving element 17 may be provided to the first side face 2c.

In this case, when the received light intensity of the light receiving element 17 is a predetermined value or greater, the support members 6a, 6b are fixed to predetermined positions (positions in which the support members 6a, 6b are fitted into the first opening 2e and the second opening 3e) by a control signal (first control signal) from the control circuit 19 configured to control the positions of the support members 6a, 6b.

On the other hand, when the user fixes the information processing device 1a to the second state, the user clicks the button 20 with the information processing device 1a in the first state, and the support members 6a, 6b are then moved to predetermined positions by a control signal (second control signal) from the control circuit 19 configured to control the positions of the support members 6a, 6b. For example, the support member 6a is moved to the position of being stored in the interior of the first housing 2 or to the position of being fitted into the first opening 2e, and the support member 6b is moved to the position of being stored in the interior of the second housing 3 or to the position of being fitted into the second opening 3e.

Second Embodiment

Next, a second embodiment of the disclosure will be described below with reference to FIGS. 4 and 5. The present embodiment differs from the first embodiment in that a living hinge 9, which includes a bending portion 9c, is provided to the front faces 2a, 3a on which the flexible display panel 5 is provided, and the rear faces 2b, 3b opposite thereto, of the first housing 2 and the second housing 3. All other components are as described in the first embodiment. For convenience of explanation, members having the same function as those illustrated in the drawings of the first embodiment are denoted using the same reference numerals, and descriptions thereof will be omitted.

Figure 4:
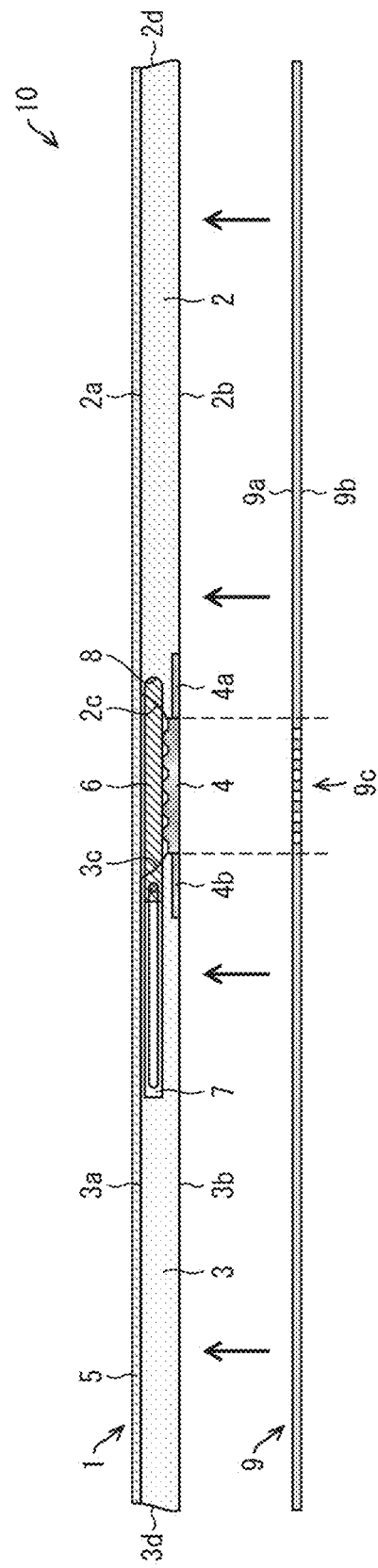
FIG. 4 is a diagram illustrating an overall configuration of the information processing device provided with a living hinge.
Figure 5:
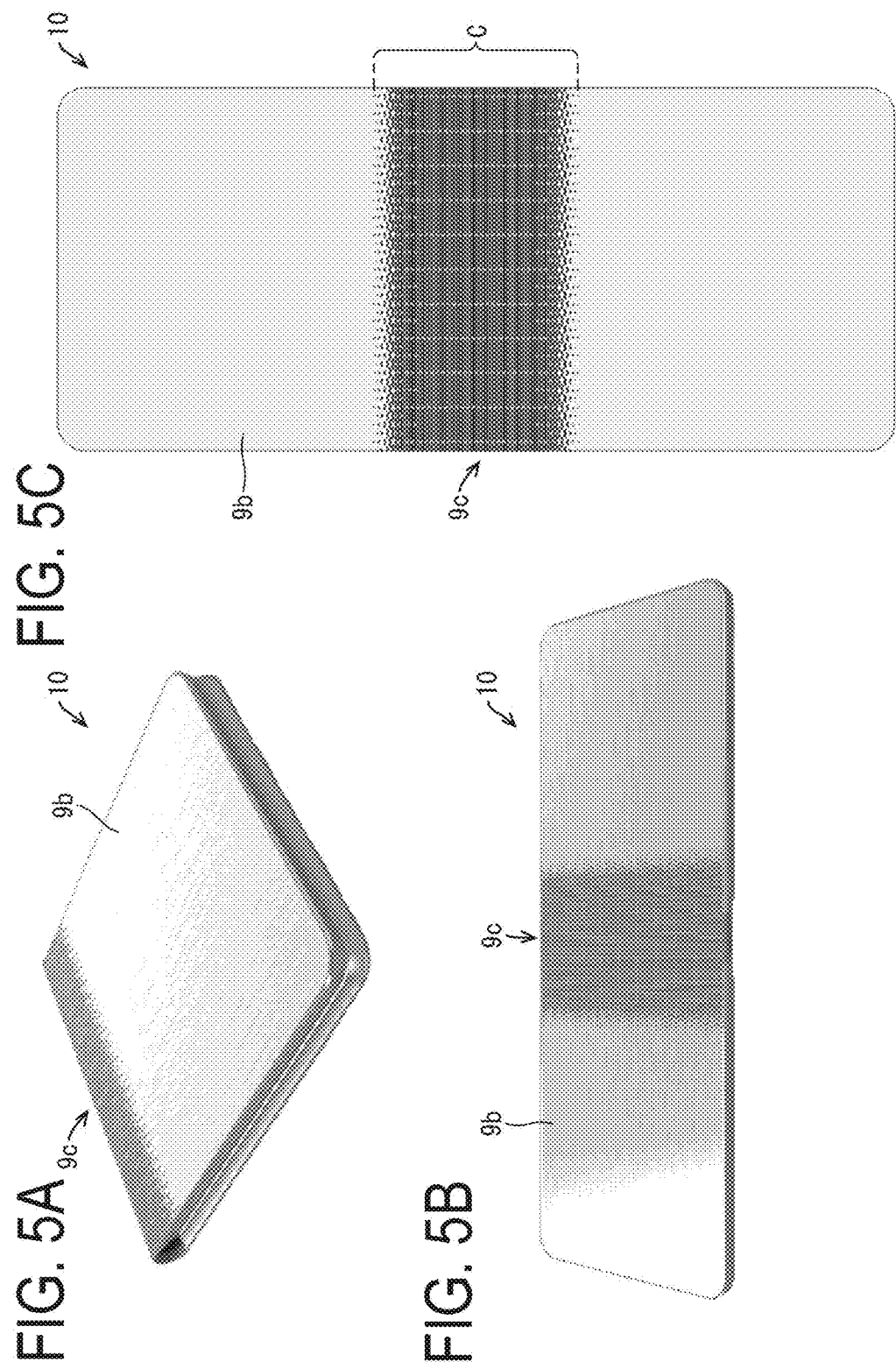
FIG. 5A is a diagram illustrating the information processing device illustrated in FIG. 4 fully closed.
FIGS. 5B and 5C are diagrams illustrating the information processing device illustrated in FIG. 4 fully opened.

FIG. 4 is a diagram illustrating an overall configuration of an information processing device 10 provided with the living hinge 9 that includes the bending portion 9c.

As illustrated, the information processing device 10 is provided with the living hinge 9, which includes the bending portion 9c, on the side opposite to the side of the information processing device 1 described in the first embodiment provided with the flexible display panel 5, and thus descriptions related to the information processing device 1 will be omitted here.

The living hinge 9 is a single substrate, and the bending portion 9c of the substrate is a portion with a plurality of holes formed therein. In the present embodiment, the size of each hole is 0.4 mm (width)×10 mm (length)×0.4 mm (depth), but the size is not limited thereto and is not particularly limited as long as the substrate can bend and a certain durability or greater can be maintained.

Further, in the present embodiment, a stainless steel substrate having a thickness of 0.4 mm is used as the substrate, and the plurality of holes extend through the substrate.

Note that while, in the present embodiment, an example is given in which a stainless steel substrate is used as the substrate, the substrate is not limited thereto and, for example, a resin substrate such as a polyimide resin substrate may be used.

Note that, in the present embodiment, a front face 9a of the living hinge 9 is fixed only to the rear face 2b of the first housing 2 and the rear face 3b of the second housing 3, and not to the bending portion 9c or the hinge 4.

With the above-described configuration, both the hinge 4 and the living hinge 9 can be sufficiently utilized.

While fixation is performed using a screw in the present embodiment, the method is not limited thereto, and an adhesive or the like, for example, may be used.

FIG. 5A is a diagram illustrating the information processing device 10 illustrated in FIG. 4 fully closed, and FIGS. 5B and 5C are diagrams illustrating the information processing device 10 illustrated in FIG. 4 fully open.

As illustrated, in the information processing device 10, a rear face 9b of the living hinge 9, which is a stainless steel substrate, is exposed to the outside, making it possible to achieve an information processing device 10 that is highly attractive. Further, as illustrated in FIG. 5C, chemical-based etching or laser light irradiation, for example, is performed and a plurality of holes are provided in a region C of the stainless steel substrate corresponding to the bending portion 9c of the hinge 9, and thus bending can be performed even when the substrate is stainless steel.

Further, while fixation at a predetermined angle is difficult when the hinge 4 is a flexible hinge, providing the living hinge 9 makes fixation at a predetermined angle possible.

While in the present embodiment an example is given in which, as illustrated in FIG. 4, the region of the living hinge 9 between the portion facing the first housing 2 and the portion facing the second housing 3 is the bending portion 9c of the living hinge 9, and a plurality of holes are provided only in the region between the portion facing the first housing 2 and the portion facing the second housing 3, the present disclosure is not limited thereto, and the plurality of holes may be formed in a region other than the region corresponding to the bending portion 9c of the living hinge 9. That is, in the living hinge 9, the plurality of holes may be formed in the portion facing the first housing 2 and the portion facing the second housing 3.

Further, while in the present embodiment the region of the living hinge 9 between the portion facing the first housing 2 and the portion facing the second housing 3 matches the bending portion 9c of the living hinge 9, the present disclosure is not limited thereto, and a portion, such as a center portion only, for example, of the region between the portion facing the first housing 2 and the portion facing the second housing 3 of the living hinge 9 may be the bending portion 9c of the living hinge 9 and, in this case, a plurality of holes may be provided to the center portion only.

Further, while in the present embodiment an example is given in which holes are formed to one size, when holes are formed in both the bending portion of the living hinge 9 and areas other than the bending portion 9c of the living hinge 9, the size of the holes formed in the bending portion 9c are preferably greater than the size of the holes formed in areas other than the bending portion 9c.

Note that, in the present embodiment, as illustrated in FIG. 5C, the density of the holes is adjusted so that an aperture ratio indicating the ratio of the surface area covered by the holes per unit surface area of the living hinge 9 decreases as the distance to the first housing 2 and the second housing 3 decreases in the bending portion 9c of the living hinge 9.

Further, when, in the living hinge 9, a portion of the region between the portion facing the first housing 2 and the portion facing the second housing 3, such as the center portion only, for example, is set as the bending portion 9c of the living hinge 9, and the holes are formed in both the bending portion 9c of the living hinge 9 and in areas other than the bending portion 9c of the living hinge 9, the ratio of the surface area covered by the holes per unit surface area of the living hinge 9 may decrease as the distance from the bending portion 9c increases.

Note that, while not separately illustrated, according to the information processing device 10, similar to the information processing device 1 illustrated in FIG. 1A, when the front face of the first housing 2 and the front face of the second housing 3 are disposed facing each other and overlap, the flexible display panel 5 of the first housing 2 and the flexible display panel 5 of the second housing 3 come into contact.

Furthermore, according to the information processing device 10, similar to the information processing device 1 illustrated in FIG. 1A, the portions of the flexible display panel 5 that are provided between the first housing 2 and the second housing 3 and face each other (the portions of the flexible display panel 5 provided to an area other than to the first housing 2 and the second housing 3) stretch and curve into an arc shape from the portion where the flexible display panel 5 of the front face of the first housing 2 and the flexible display panel 5 of the front face of the second housing 3 come into contact.

According to the configuration described above, when the front face of the first housing 2 and the front face of the second housing 3 are disposed facing each other and overlap, damage to the flexible display panel 5 can be suppressed.

Third Embodiment

Next, a third embodiment of the disclosure will be described below with reference to FIG. 6. The present embodiment differs from the first and second embodiments in that the living hinge 9 is used as the hinge in place of the hinge 4. All other components are as described in the first and second embodiments. For convenience of explanation, members having the same function as those illustrated in the drawings of the first and second embodiments are denoted using the same reference numerals, and descriptions thereof will be omitted.

Figure 6:
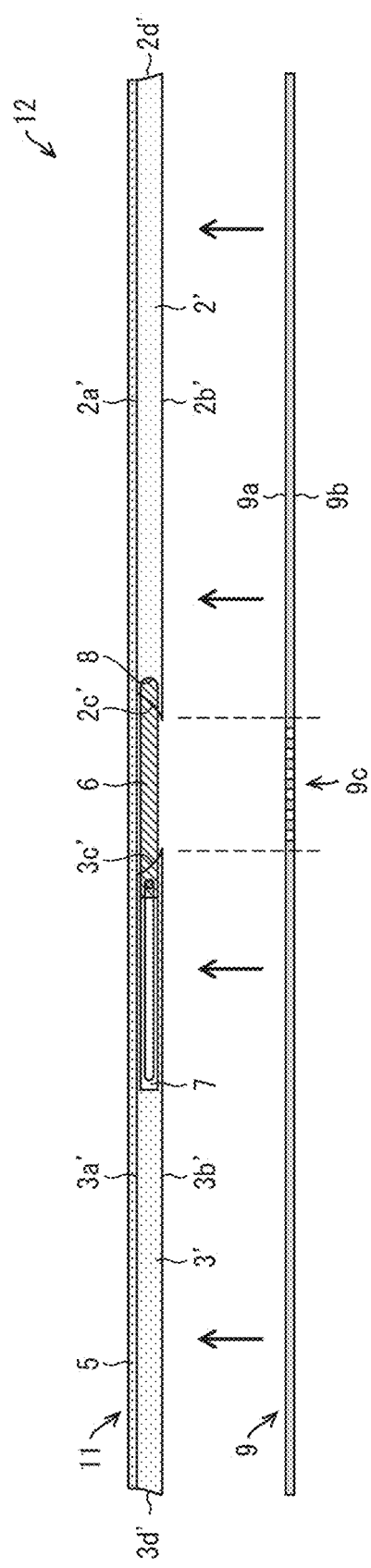
FIG. 6 is a diagram illustrating an overall configuration of the information processing device in which the living hinge is used.

FIG. 6 is a diagram illustrating an overall configuration of an information processing device 12 in which the living hinge 9 is used.

The information processing device 12 in FIG. 6 differs from the information processing device 1 of the first and second embodiments described above in that the hinge 4 is not provided, decreasing the thickness accordingly.

The information processing device 12 is provided with the living hinge 9 on the side opposite to the side of the information processing device 12 on which the flexible display panel 5 is provided.

According to the above-described configuration, it is possible to achieve the information processing device 12 that is thinner and can be fixed at a predetermined angle.

Note that, while not separately illustrated, according to the information processing device 12, similar to the information processing device 1 illustrated in FIG. 1A, when a front face of a first housing 2' and a front face of a second housing 3' are disposed facing each other and overlap, the flexible display panel 5 of the first housing 2' and the flexible display panel 5 of the second housing 3' come into contact.

Furthermore, according to the information processing device 12, similar to the information processing device 1 illustrated in FIG. 1A, the portions of the flexible display panel 5 that are provided between the first housing 2' and the second housing 3' and face each other (the portions of the flexible display panel 5 provided to an area other than to the first housing 2' and the second housing 3') stretch and curve into an arc shape from the portion where the flexible display panel 5 of the front face of the first housing 2' and the flexible display panel 5 of the front face of the second housing 3' come into contact.

According to the configuration described above, when the front face of the first housing 2' and the front face of the second housing 3' are disposed facing each other and overlap, damage to the flexible display panel 5 can be suppressed.

Fourth Embodiment

Next, a fourth embodiment of the disclosure will be described below with reference to FIGS. 7A and 7B. The present embodiment differs from the second embodiment in that the living hinge 9 is provided across the interior of the first housing 2 and the interior of the second housing 3. All other components are as described in the second embodiment. For convenience of explanation, members having the same function as those illustrated in the drawings of the second embodiment are denoted using the same reference numerals, and descriptions thereof will be omitted.

FIGS. 7A and 7B are diagrams illustrating an overall configuration of an information processing device 14 with the living hinge 9 provided across the interior of the first housing 2 and the interior of the second housing 3. FIG. 7A illustrates the information processing device 14 fully open, and FIG. 7B illustrates the information processing device 14 fully closed.

As illustrated, in the information processing device 14, the living hinge 9 is provided across the interior of the first housing 2 and the interior of the second housing 3.

A hinge 13 is a hinge obtained by overlapping the hinge 4 and the living hinge 9.

According to the above-described configuration, it is possible to achieve the information processing device 14 that is thinner and can be fixed at a predetermined angle.

In this embodiment, the one portions 4a, 4b of the hinge 4 are fixed to the living hinge 9, and subsequently the hinge 13 obtained by overlapping the hinge 4 and the living hinge 9 is fixed to the interior of the first housing 2 and the interior of the second housing 3. Note that, while fixation is carried out using an adhesive, the method is not limited thereto.

According to the information processing device 14, as illustrated in FIG. 7B, when the front face of the first housing 2 and the front face of the second housing 3 are disposed facing each other and overlap, the flexible display panel 5 of the first housing 2 and the flexible display panel 5 of the second housing 3 come into contact.

Furthermore, according to the information processing device 14, as illustrated in FIG. 7B, the portions of the flexible display panel 5 that are provided between the first housing 2 and the second housing 3 and face each other (the portions of the flexible display panel 5 provided to an area other than to the first housing 2 and the second housing 3) stretch and curve into an arc shape from the portion where the flexible display panel 5 of the front face of the first housing 2 and the flexible display panel 5 of the front face of the second housing 3 come into contact.

According to the configuration described above, when the front face of the first housing 2 and the front face of the second housing 3 are disposed facing each other and overlap, damage to the flexible display panel 5 can be suppressed.

Fifth Embodiment

Next, a fifth embodiment of the disclosure will be described below with reference to FIG. 8. The present embodiment differs from the third embodiment in that only the living hinge 9 is provided across the interior of the first housing 2' and the interior of the second housing 3' as the hinge. All other components are as described in the third embodiment. For convenience of explanation, members having the same function as those illustrated in the drawings of the third embodiment are denoted using the same reference numerals, and descriptions thereof will be omitted.

Figure 8:
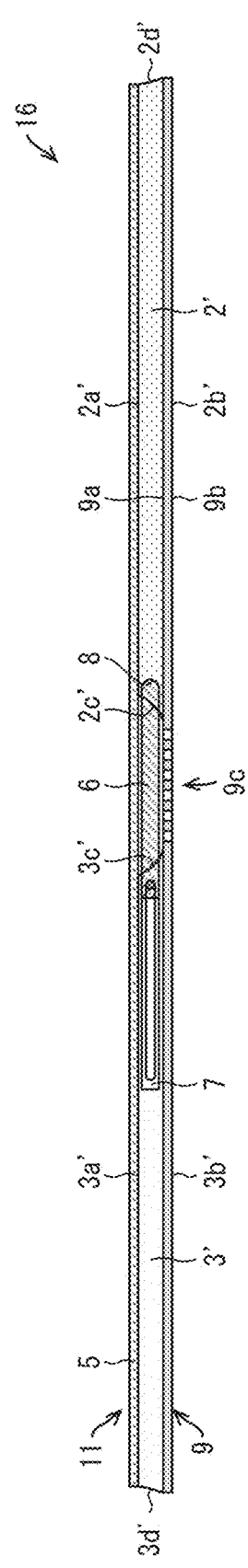
FIG. 8 is a diagram illustrating an overall configuration of the information processing device with only the living hinge provided across the interior of the first housing and the interior of the second housing serving as the hinge.
Figure 9A:
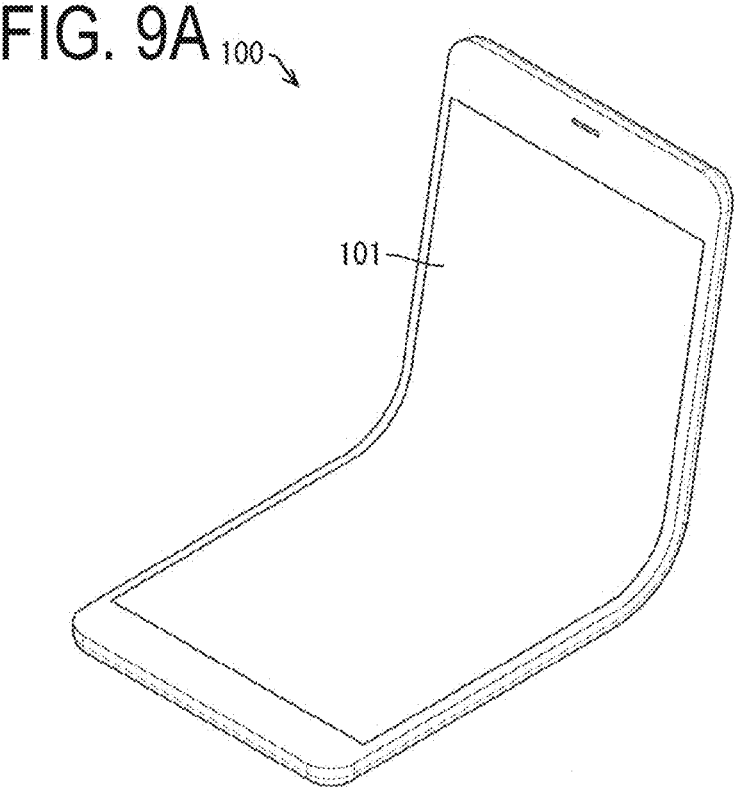
FIG. 9A is a diagram illustrating an overall configuration of a flexible mobile terminal device of a related art provided with the flexible display panel described in PTL 1.
Figure 9B:
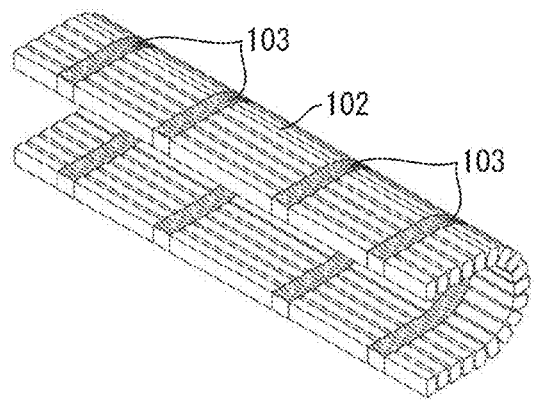
FIG. 9B is a diagram illustrating an overall configuration of a folding portion provided to the flexible mobile terminal device of the related art.

FIG. 8 is a diagram illustrating an overall configuration of an information processing device 16 in which only the living hinge 9 is provided across the interior of the first housing 2' and the interior of the second housing 3'.

As illustrated, in the information processing device 16, only the living hinge 9 is provided across the interior of the first housing 2' and the interior of the second housing 3' as the hinge.

According to the above-described configuration, it is possible to achieve the information processing device 16 that is thinner and can be fixed at a predetermined angle.

In the present embodiment the living hinge 9 is fixed to the interior of the first housing 2' and the interior of the second housing 3' using an adhesive. The method of fixation, however, is not limited thereto.

Note that, while not separately illustrated, according to the information processing device 16, similar to the information processing device 1 illustrated in FIG. 1A, when the front face of the first housing 2' and the front face of the second housing 3' are disposed facing each other and overlap, the flexible display panel 5 of the first housing 2' and the flexible display panel 5 of the second housing 3' come into contact.

Furthermore, according to the information processing device 16, similar to the information processing device 1 illustrated in FIG. 1A, the portions of the flexible display panel 5 that are provided between the first housing 2' and the second housing 3' and face each other (the portions of the flexible display panel 5 provided to an area other than to the first housing 2' and the second housing 3'), stretch and curve into an arc shape from the portion where the flexible display panel 5 of the front face of the first housing 2' and the flexible display panel 5 of the front face of the second housing 3' come into contact.

According to the configuration described above, when the front face of the first housing 2' and the front face of the second housing 3' are disposed facing each other and overlap, damage to the flexible display panel 5 can be suppressed.

CONCLUSION

An information processing device according to a first aspect of the disclosure includes a first housing provided with a front face, a rear face, a first side face, and a first opening, the front face and the rear face facing each other; a second housing provided with a front face, a rear face, a second side face, and a second opening, the front face and the rear face facing each other; a first hinge that connects a lower portion of the first housing that includes the rear face of the first housing, and a lower portion of the second housing that includes the rear face of the second housing; and a flexible display panel provided across the front face of the first housing and the front face of the second housing. The first hinge includes a plate-shaped hinge configured to at least partially bend. The first opening of the first side face of the first housing and the second opening of the second side face of the second housing, the first side face and the second side face being adjacent to the first hinge, are provided such that at least a portion of the first opening and at least a portion of the second opening are disposed facing each other in a first state where the first side face and the second side face are disposed facing each other. A support member is provided being configured to move between the flexible display panel and the first hinge, from one of the first side face and the second side face toward the other. The support member, in the first state, is fitted into the first opening and the second opening and fixed. Further, the support member, in a second state where the first side face and the second side face are not facing each other, is stored in an interior of one of the first housing and the second housing or fitted into one of the first opening and the second opening.

According to the above-described configuration, in the first state where the first side face and the second side face are disposed facing each other, the support member can be fitted into the first opening and the second opening and fixed, making it possible to suppress the possibility of change from the first state to a non-preferred state by unpredictable contact or the like.

According to the above-described configuration, in the second state where the first side face and the second side face are disposed not facing each other, the support member is stored in the interior of one of the first housing and the second housing or fitted into one of the first opening and the second opening, and thus is never bendable in the first state or the second state.

Further, according to the above-described configuration, in the first state, the support member exists between the flexible display panel and the first hinge, making it possible to suppress the effects of ridges when a section where ridges remain on a front face of the first hinge occurs in association with the number of years of usage.

Furthermore, according to the above-described configuration, the first hinge includes a plate-shaped hinge configured to at least partially bend, making it possible to achieve an information processing device that is thin and free of large protruding portions compared to when, in related art, a U-shaped hinge provided to a storage space or the like is used.

According to the information processing device of a second aspect of the disclosure, in the first aspect, the first hinge may include a flexible hinge made from a rubber or a silicone; the second hinge may include a single substrate made from a resin or a metal; the first hinge may be provided across the interior of the first housing and the interior of the second housing via the first opening and the second opening; and the second hinge may be provided across the rear face of the first housing and the rear face of the second housing, and may include a plurality of holes formed in at least a region between a portion facing the first housing and a portion facing the second housing.

According to the above-described configuration, it is possible to achieve an information processing device that can be fixed at a predetermined angle.

According to the information processing device of a third aspect of the disclosure, in the first aspect, the first hinge may include a single substrate made from a resin or a metal; and the first hinge may be provided across the rear face of the first housing and the rear face of the second housing, and may include a plurality of holes formed in at least a region between a portion facing the first housing and a portion facing the second housing.

According to the above-described configuration, it is possible to achieve an information processing device that can be fixed at a predetermined angle.

According to the information processing device of a fourth aspect of the disclosure, in the first aspect, the first hinge may include a hinge obtained by overlapping a flexible hinge made from a rubber or a silicone, and a single substrate made from a resin or a metal; the first hinge may be provided across the interior of the first housing and the interior of the second housing via the first opening and the second opening; and the single substrate made from a resin or a metal of the first hinge may include a plurality of holes formed in at least a region between a portion facing the first housing and a portion facing the second housing.

According to the above-described configuration, it is possible to achieve the information processing device that is thinner and can be fixed at a predetermined angle.

According to the information processing device of a fifth aspect of the disclosure, in the first aspect, the first hinge may include a single substrate made from a resin or a metal; and the first hinge may be provided across the interior of the first housing and the interior of the second housing via the first opening and the second opening, and may include a plurality of holes formed in at least a region between a portion facing the first housing and a portion facing the second housing.

According to the above-described configuration, it is possible to achieve the information processing device that is thinner and can be fixed at a predetermined angle.

According to the information processing device of a sixth aspect of the disclosure, in any one of the second to fifth aspects, the plurality of holes may be formed only in a bending portion of a region between a portion facing the first housing and a portion facing the second housing in the substrate.

According to the above-described configuration, it is possible to achieve an information processing device that can be fixed at a predetermined angle.

According to the information processing device of a seventh aspect of the disclosure, in any one of the second to fifth aspects, a size of the holes formed in the bending portion of a region between a portion facing the first housing and a portion facing the second housing in the substrate may be greater than a size of the holes formed in other portions.

According to the above-described configuration, it is possible to achieve an information processing device that can be fixed at a predetermined angle.

According to the information processing device of an eighth aspect of the disclosure, in any one of the second to seventh aspects, an aperture ratio indicating the ratio of a surface area covered by holes per unit surface area in the substrate may decrease as a distance from the bending portion of the region between a portion facing the first housing and a portion facing the second housing increases.

According to the above-described configuration, it is possible to achieve an information processing device that can be fixed at a predetermined angle.

According to the information processing device of a ninth aspect of the disclosure, in any one of the first to eighth aspects, the flexible display panel is preferably fixed only to the front face of the first housing and the front face of the second housing.

According to the above-described configuration, it is possible to suppress damage to the flexible display panel when one of the first housing and the second housing is rotated with respect to the other.

According to the information processing device of a tenth aspect of the disclosure, in the ninth aspect, the flexible display panel of the front face of the first housing and the flexible display panel of the front face of the second housing may come into contact in the second state when the front face of the first housing and the front face of the second housing are disposed facing each other and overlap.

According to the above-described configuration, when the front face of the first housing and the front face of the second housing are disposed facing each other and overlap, damage to the flexible display panel can be suppressed.

According to the information processing device of an eleventh aspect of the disclosure, in the tenth aspect, portions of the flexible display panel facing each other, provided between the first housing and second housing, may stretch and curve into an arc shape from the portion where the flexible display panel of the front face of the first housing and the flexible display panel of the front face of the second housing come into contact.

According to the above-described configuration, when the front face of the first housing and the front face of the second housing are disposed facing each other and overlap, damage to the flexible display panel can be suppressed.

According to the information processing device according to a twelfth aspect of the disclosure, in any one of the second to eighth aspects, the substrate may be fixed only to the first housing and the second housing.

According to the above-described configuration, the hinge or the substrate that includes the plurality of holes can be sufficiently utilized.

According to the information processing device of a thirteenth aspect of the disclosure, in any one of the first to twelfth aspects, an upper face of the support member, the front face of the first housing, and the front face of the second housing preferably form a same plane in the first state.

According to the above-described configuration, it is possible to achieve an information processing device in which the flexible display panel is supported by the upper face of the support member, the front face of the first housing, and the front face of the second housing that form the same plane.

According to the information processing device of a fourteenth aspect of the disclosure, in any one of the first to thirteenth aspects, the support member may be configured to move along a rail provided to the interior of at least one of the first housing and the second housing.

According to the above-described configuration, it is possible to achieve an information processing device in which the support member is supported by a rail.

According to the information processing device of a fifteenth aspect of the disclosure, in any one of the first to fourteenth aspects, the support member may be configured to be controlled by a control circuit configured to output a control signal that differs according to a selection by a user.

According to the above-described configuration, it is possible to achieve an information processing device in which the support member is controlled by a control circuit.

According to the information processing device of a sixteenth aspect of the disclosure, in any one of the first to fifteenth aspects, the information processing device may further include a light emitting element provided to one of the first side face and the second side face, and a light receiving element provided to the other of the first side face and the second side face and configured to receive light from the light emitting element. In such a configuration, the support member may be configured to output a first control signal when a received light intensity of the light receiving element is a predetermined value or greater, and be controlled by a control circuit configured to output a second control signal by a selection of a user.

According to the above-described configuration, it is possible to achieve an information processing device in which the support member is controlled by a control circuit.

According to the information processing device of a seventeenth aspect of the disclosure, in any one of the first to sixteenth aspects, the support member may be provided in a plurality, and directions of movement between the flexible display panel and the hinge by a first portion of the plurality of support members and a second portion of the plurality of support members may be opposite each other.

According to the above-described configuration, it is possible to achieve an information processing device that includes a plurality of support members.

According to the information processing device of an eighteenth aspect of the disclosure, in any one of the first to seventeenth aspects, the flexible display panel may include a flexible organic EL panel.

According to the above-described configuration, it is possible to achieve an information processing device that includes a flexible organic EL panel as the flexible display panel.

Notes

The disclosure is not limited to each of the embodiments stated above, and various modifications may be implemented within a range not departing from the scope of the claims. Embodiments obtained by appropriately combining technical approaches stated in each of the different embodiments also fall within the scope of the technology of the disclosure. Moreover, novel technical features may be formed by combining the technical approaches stated in each of the embodiments.

INDUSTRIAL APPLICABILITY

The disclosure can be utilized in an information processing device that includes a flexible display panel.

REFERENCE SIGNS LIST

1 Information processing device
2 First housing
2a Front face of first housing
2b Rear face of first housing
2c First side face
2e First opening
2' First housing
3 Second housing
3a Front face of second housing
3b Rear face of second housing
3c Second side face
3e Second opening
3' Second housing
4 Hinge (first hinge)
5 Flexible display panel
6 Support member
6a Support member
6b Support member
7 First rail
8 Second rail
9 Living hinge (first hinge or second hinge)
9c Bending portion
10 Information processing device
12 Information processing device
13 Hinge (first hinge)
14 Information processing device
16 Information processing device
19 Control circuit
20 Button

The invention claimed is:

1. An information processing device comprising:
a first housing provided with a front face, a rear face, a first side face, and a first opening, the front face and the rear face facing each other;
a second housing provided with a front face, a rear face, a second side face, and a second opening, the front face and the rear face facing each other;
a first hinge that connects a lower portion of the first housing that includes the rear face of the first housing, and a lower portion of the second housing that includes the rear face of the second housing; and
a flexible display panel provided across the front face of the first housing and the front face of the second housing,
wherein the first hinge includes a plate-shaped hinge configured to at least partially bend;
the first opening of the first side face of the first housing and the second opening of the second side face of the second housing, the first side face and the second side face being adjacent to the first hinge, are provided so that at least a portion of the first opening and at least a portion of the second opening are disposed facing each other in a first state where the first side face and the second side face are disposed facing each other;
a support member is provided that is configured to move between the flexible display panel and the first hinge, from one of the first side face and the second side face toward the other;
the support member, in the first state, is fitted into the first opening and the second opening and fixed;
the support member, in a second state where the first side face and the second side face are not facing each other, is stored in an interior of one of the first housing and the second housing or fitted into one of the first opening and the second opening;
the first hinge includes a flexible hinge made from a rubber or a silicone,
a second hinge includes a single substrate made from a resin or a metal,
the first hinge is provided across the interior of the first housing and the interior of the second housing via the first opening and the second opening, and
the second hinge is provided across the rear face of the first housing and the rear face of the second housing, and includes a plurality of holes formed in at least a region between a portion facing the first housing and a portion facing the second housing.

2. The information processing device according to claim 1,
wherein the plurality of holes are formed only in a bending portion of a region between a portion facing the first housing and a portion facing the second housing in the substrate.

3. The information processing device according to claim 1,
wherein a size of the holes formed in the bending portion of a region between a portion facing the first housing and a portion facing the second housing in the substrate is greater than a size of the holes formed in other portions.

4. The information processing device according to claim 1,
wherein an aperture ratio indicating the ratio of a surface area covered by the holes per unit surface area in the substrate decreases as a distance from the bending portion of the region between a portion facing the first housing and a portion facing the second housing increases.

5. The information processing device according to claim 1,
wherein the flexible display panel is fixed only to the front face of the first housing and the front face of the second housing.

6. The information processing device according to claim 5,
wherein in the second state when the front face of the first housing and the front face of the second housing are disposed facing each other and overlap, the flexible display panel of the front face of the first housing and the flexible display panel of the front face of the second housing come into contact.

7. The information processing device according to claim 6,
wherein portions of the flexible display panel facing each other, provided between the first housing and second housing, stretch and curve into an arc shape from the portion where the flexible display panel of the front face of the first housing and the flexible display panel of the front face of the second housing come into contact.

8. The information processing device according to claim 1,
wherein the substrate is fixed only to the first housing and the second housing.

9. The information processing device according to claim 1,
wherein an upper face of the support member, the front face of the first housing, and the front face of the second housing form a same plane in the first state.

10. The information processing device according to claim 1,
wherein the support member is configured to move along a rail provided to the interior of at least one of the first housing and the second housing.

11. The information processing device according to claim 1,
wherein the support member is configured to be controlled by a control circuit is configured to output a control signal that differs according to a selection by a user.

12. The information processing device according to claim 1 further comprising:
a light emitting element provided to one of the first side face and the second side face; and
a light receiving element provided to the other of the first side face and the second side face and configured to receive light from the light emitting element,
wherein the support member is configured to output a first control signal when a received light intensity of the light receiving element is a predetermined value or greater, and be controlled by a control circuit configured to output a second control signal by a selection of a user.

13. The information processing device according to claim 1,
wherein the support member is provided in a plurality, and directions of movement between the flexible display panel and the hinge by a first portion of the plurality of support members and a second portion of the plurality of support members are opposite each other.

14. The information processing device according to claim 1,
wherein the flexible display panel includes a flexible organic EL panel.

15. An information processing device comprising:
a first housing provided with a front face, a rear face, a first side face, and a first opening, the front face and the rear face facing each other;
a second housing provided with a front face, a rear face, a second side face, and a second opening, the front face and the rear face facing each other;
a first hinge that connects a lower portion of the first housing that includes the rear face of the first housing, and a lower portion of the second housing that includes the rear face of the second housing; and
a flexible display panel provided across the front face of the first housing and the front face of the second housing;
wherein the first hinge includes a plate-shaped hinge configured to at least partially bend;
the first opening of the first side face of the first housing and the second opening of the second side face of the second housing, the first side face and the second side face being adjacent to the first hinge, are provided so that at least a portion of the first opening and at least a portion of the second opening are disposed facing each other in a first state where the first side face and the second side face are disposed facing each other;
a support member is provided that is configured to move between the flexible display panel and the first hinge, from one of the first side face and the second side face toward the other;
the support member, in the first state, is fitted into the first opening and the second opening and fixed;
the support member, in a second state where the first side face and the second side face are not facing each other, is stored in an interior of one of the first housing and the second housing or fitted into one of the first opening and the second opening;
the first hinge includes a hinge obtained by overlapping a flexible hinge made from a rubber or a silicone, and a single substrate made from a resin or a metal,
the first hinge is provided across the interior of the first housing and the interior of the second housing via the first opening and the second opening, and
the single substrate made from a resin or a metal of the first hinge includes a plurality of holes formed in at least a region between a portion facing the first housing and a portion facing the second housing.

16. The information processing device according to claim 15,
wherein the support member is configured to be controlled by a control circuit configured to output a control signal that differs according to a selection by a user.

17. The information processing device according to claim 15 further comprising:
a light emitting element provided to one of the first side face and the second side face; and
a light receiving element provided to the other of the first side face and the second side face and configured to receive light from the light emitting element,
wherein the support member is configured to output a first control signal when a received light intensity of the light receiving element is a predetermined value or greater, and be controlled by a control circuit configured to output a second control signal by a selection of a user.

18. The information processing device according to claim 15,
wherein the support member is provided in a plurality, and directions of movement between the flexible display panel and the hinge by a first portion of the plurality of support members and a second portion of the plurality of support members are opposite each other.

19. An information processing device comprising:
a first housing provided with a front face, a rear face, a first side face, and a first opening, the front face and the rear face facing each other;
a second housing provided with a front face, a rear face, a second side face, and a second opening, the front face and the rear face facing each other;
a first hinge that connects a lower portion of the first housing that includes the rear face of the first housing, and a lower portion of the second housing that includes the rear face of the second housing; and
a flexible display panel provided across the front face of the first housing and the front face of the second housing,
wherein the first hinge includes a plate-shaped hinge configured to at least partially bend,
the first opening of the first side face of the first housing and the second opening of the second side face of the second housing, the first side face and the second side face being adjacent to the first hinge, are provided such that at least a portion of the first opening and at least a portion of the second opening are disposed facing each other in a first state where the first side face and the second side face are disposed facing each other, a support member is provided being configured to move between the flexible display panel and the first hinge, from one of the first side face and the second side face toward the other, the support member, in the first state, is fitted into the first opening and the second opening and fixed, the support member, in a second state where the first side face and the second side face are not facing each other, is stored in an interior of one of the first housing and the second housing or fitted into one of the first opening and the second opening, the support member is provided in a plurality, and directions of movement between the flexible display panel and the hinge of a first portion of the plurality of support members and a second portion of the plurality of support members are opposite each other.

20. The information processing device according to claim 19 further comprising:

a light emitting element provided to one of the first side face and the second side face; and a light receiving element provided to the other of the first side face and the second side face and configured to receive light from the light emitting element, wherein the support member is configured to output a first control signal when a received light intensity of the light receiving element is a predetermined value or greater, and be controlled by a control circuit configured to output a second control signal by a selection of a user.

* * * * *